United States Patent
Biswas et al.

(10) Patent No.: US 8,902,359 B1
(45) Date of Patent: Dec. 2, 2014

(54) PROCESSOR IMPLEMENTED SYSTEMS AND METHODS FOR HANDLING OF OCCLUSION FOR FRAME RATE UPCONVERSION

(75) Inventors: Mainak Biswas, Santa Cruz, CA (US); Vipin Namboodiri, Bangalore (IN)

(73) Assignee: Marvell International Ltd., Hamilton (BM)

( * ) Notice: Subject to any disclaimer, the term of this patent is extended or adjusted under 35 U.S.C. 154(b) by 84 days.

(21) Appl. No.: 13/413,992

(22) Filed: Mar. 7, 2012

Related U.S. Application Data

(60) Provisional application No. 61/450,523, filed on Mar. 8, 2011.

(51) Int. Cl.
*H04N 11/20* (2006.01)
(52) U.S. Cl.
USPC ............ 348/452; 382/236; 382/238; 382/232
(58) Field of Classification Search
CPC ...................................... H04N 7/014
See application file for complete search history.

(56) References Cited

U.S. PATENT DOCUMENTS

| | | | | |
|---|---|---|---|---|
| 6,011,596 A | * | 1/2000 | Burl et al. ..................... | 348/699 |
| 2005/0163355 A1 | * | 7/2005 | Mertens ........................ | 382/128 |
| 2008/0238942 A1 | * | 10/2008 | Sun et al. ...................... | 345/634 |

* cited by examiner

*Primary Examiner* — Jefferey Harold
*Assistant Examiner* — Samira Monshi

(57) ABSTRACT

Systems and methods are provided for determining pixels in an interpolated frame. A motion vector field is determined based on movement of pixels between first and second frames. A region of the motion vector field is clustered based on similarity of motion vectors of the motion vector field within the region. A region of discontinuity is identified comprising a portion of the motion vector field not belonging to a cluster. A determination is made as to whether the region of discontinuity is an occlusion region or a reveal region. A portion of the region of discontinuity in the interpolated frame is filled using pixel data from the first frame when the region of discontinuity is an occlusion region, and a portion of the region of discontinuity in the interpolated frame is filled using pixel data from the second frame when the region of discontinuity is a reveal region.

17 Claims, 11 Drawing Sheets

PROCESSOR IMPLEMENTED SYSTEMS AND METHODS FOR HANDLING OF OCCLUSION FOR FRAME RATE UPCONVERSION

CROSS-REFERENCE TO RELATED APPLICATIONS

This application claims priority to U.S. Provisional Patent Application No. 61/450,523, filed Mar. 8, 2011, entitled "On Handling of Occlusion for Frame Rate Upconversion Using Video Inpainting," the entirety of which is herein incorporated by reference.

FIELD

The technology described herein relates generally to video processing and more particularly to frame interpolation during frame rate up-conversion.

BACKGROUND

Video is the technology of electronically capturing, recording, processing, storing, transmitting, and reconstructing a sequence of still images representing scenes in motion. The still images are provided to a viewer at a constant rate. The constant rate refreshes the still images faster than the human eye can detect, resulting in the appearance of fluid motion. The constant rate of refreshing the still images is known as a frame rate.

Frame rates may vary from application to application for many different reasons. For example, camera equipment used to capture the still images may be limited to one or a particular number of available frame rates. As another example, certain videos may offer a more pleasing appearance when provided at particular frame rates. For example, film and video makers often use a 24 hertz (frames-per-second) frame rate to achieve an on-screen look that matches native film. As a further example, certain viewing devices (e.g., televisions) are configured to operate at one of a select number of frame rates (e.g., PAL and SECAM televisions operate at a standard rate of 50 hertz, NTSC televisions operate at a standard rate of 60 hertz, and certain experimental viewers operate at a rate of 72 hertz).

While video may be captured and stored at any of a number of frame rates, it may be desirable to provide or view that video at a different frame rate from which it was captured or stored. Frame rate conversion provides a mechanism for changing frame rates from a frame rate at which the video is stored to a frame rate desired for viewing. Video can be converted to a higher frame rate using an upconversion operation, where one or more additional frames are interpolated between the existing frames of a source video.

SUMMARY

Examples of systems and methods are provided for determining pixels in an interpolated frame. In one example, a motion vector field is determined based on movement of pixels between a first frame and a second frame. A region of the motion vector field is clustered based on similarity of motion vectors of the motion vector field within the region. A region of discontinuity is identified comprising a portion of the motion vector field not belonging to a cluster. A determination is made as to whether the region of discontinuity is an occlusion region or a reveal region. A portion of the region of discontinuity in the interpolated frame is filled using pixel data from the first frame when the region of discontinuity is an occlusion region, and a portion of the region of discontinuity in the interpolated frame is filled using pixel data from the second frame when the region of discontinuity is a reveal region.

As further examples, the region of discontinuity may be determined to be an occlusion region or a reveal region based on a presence of pixels in one of the first frame or the second frame but not both. The region of discontinuity is determined to be an occlusion region when a pixel in the region of discontinuity is present in the first frame and is not present in the second frame, and the region of discontinuity is determined to be a reveal region when a pixel in the region of discontinuity is present in the second frame but not the first frame. The motion vector field may be smoothed prior to being used in generating the inflow vector field and the outflow vector field.

As further examples, the region of discontinuity can be filled based on an average of surrounding pixels or using a patch operation. A patch operation fetches a candidate patch that is copied from the interpolated frame, the first frame, or the second frame, where the candidate patch is a block of pixels. The candidate patch can be evaluated using a sum of squared difference calculation. The candidate patch can be copied from the first frame or other preceding frame when the region of discontinuity is an occlusion region, and the candidate patch can be copied from the second frame or a subsequent frame when the region of discontinuity is a reveal region. The portion of the region of discontinuity may be filled using an in-painting operation. The interpolated frame may be generated during a frame rate up-conversion operation.

As another example, a system for determining pixels in an interpolated frame may include one or more data processors and a computer-readable medium encoded with instructions for commanding the one or more data processors to perform functions. A motion vector field is determined based on movement of pixels between a first frame and a second frame. A region of the motion vector field is clustered based on similarity of motion vectors of the motion vector field within the region. A region of discontinuity is identified comprising a portion of the motion vector field not belonging to a cluster. A determination is made as to whether the region of discontinuity is an occlusion region or a reveal region. A portion of the region of discontinuity in the interpolated frame is filled using pixel data from the first frame when the region of discontinuity is an occlusion region, and a portion of the region of discontinuity in the interpolated frame is filled using pixel data from the second frame when the region of discontinuity is a reveal region.

As another example, a computer readable medium is encoded with instructions for commanding one or more data processors for executing a method for determining pixels in an interpolated frame. In the method, a motion vector field is determined based on movement of pixels between a first frame and a second frame. A region of the motion vector field is clustered based on similarity of motion vectors of the motion vector field within the region. A region of discontinuity is identified comprising a portion of the motion vector field not belonging to a cluster. A determination is made as to whether the region of discontinuity is an occlusion region or a reveal region. A portion of the region of discontinuity in the interpolated frame is filled using pixel data from the first frame when the region of discontinuity is an occlusion region, and a portion of the region of discontinuity in the interpolated frame is filled using pixel data from the second frame when the region of discontinuity is a reveal region.

DETAILED DESCRIPTION

Figure 1:
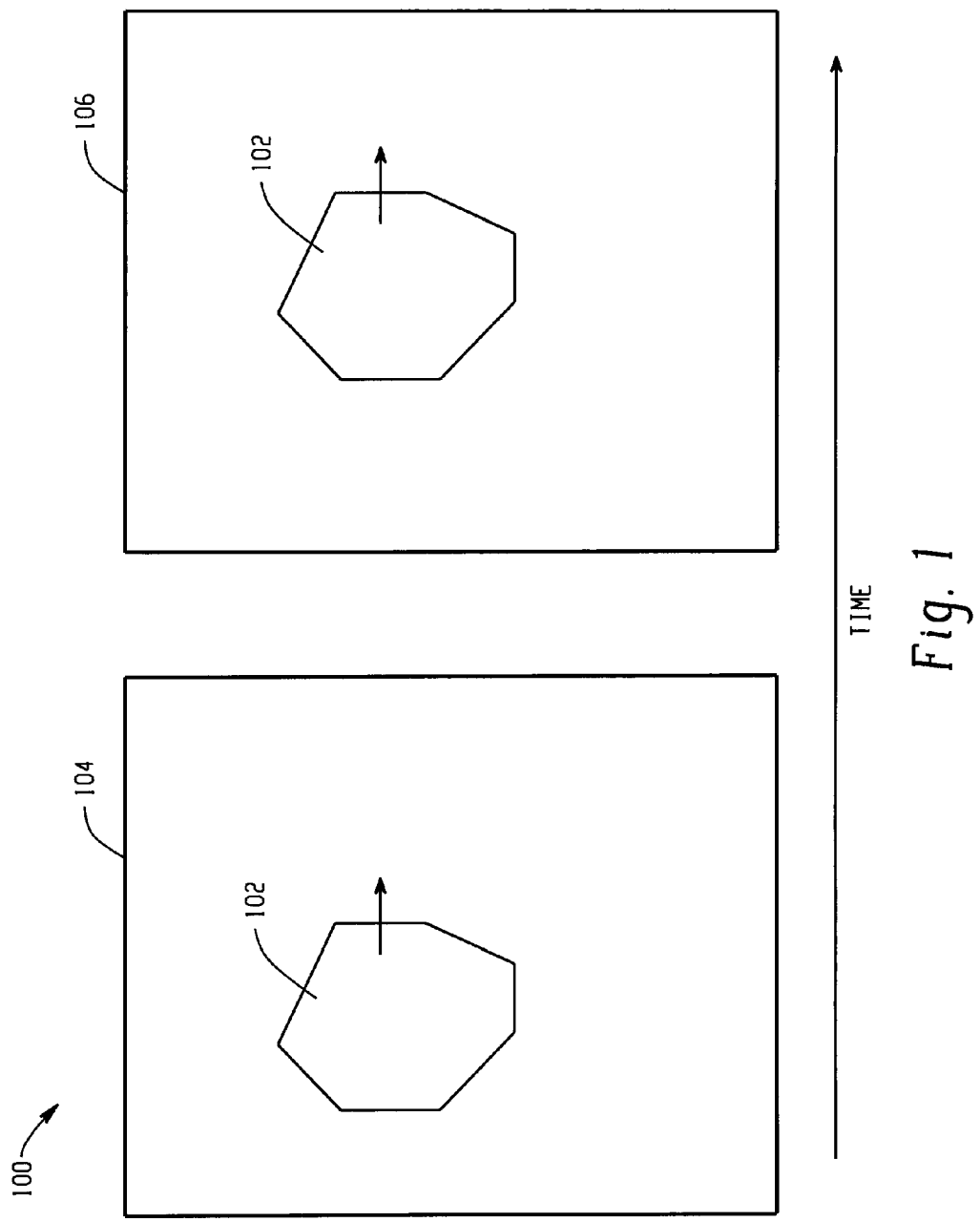
FIG. 1 depicts two video frames displaying an object in motion.

FIG. 1 depicts two video frames displaying an object in motion. The video depicts the object 102 moving from left to right, as indicated by the arrow, over the course of two frames, a first frame 104 and a second frame 106. By displaying the video frames at a sufficiently high frame rate, the object 102 will appear to move smoothly from its position in the first frame 104 to its position in the second frame 106.

It may be desired to convert the video stored at the frame rate shown in FIG. 1 to a higher frame rate, resulting in additional interpolated frames being stored and provided to a viewer over the same amount of time. For example, the video depicted in FIG. 1 may be stored at 25 hertz, and it may be desired to upconvert the video of FIG. 1 to 75 hertz.

Figure 2:
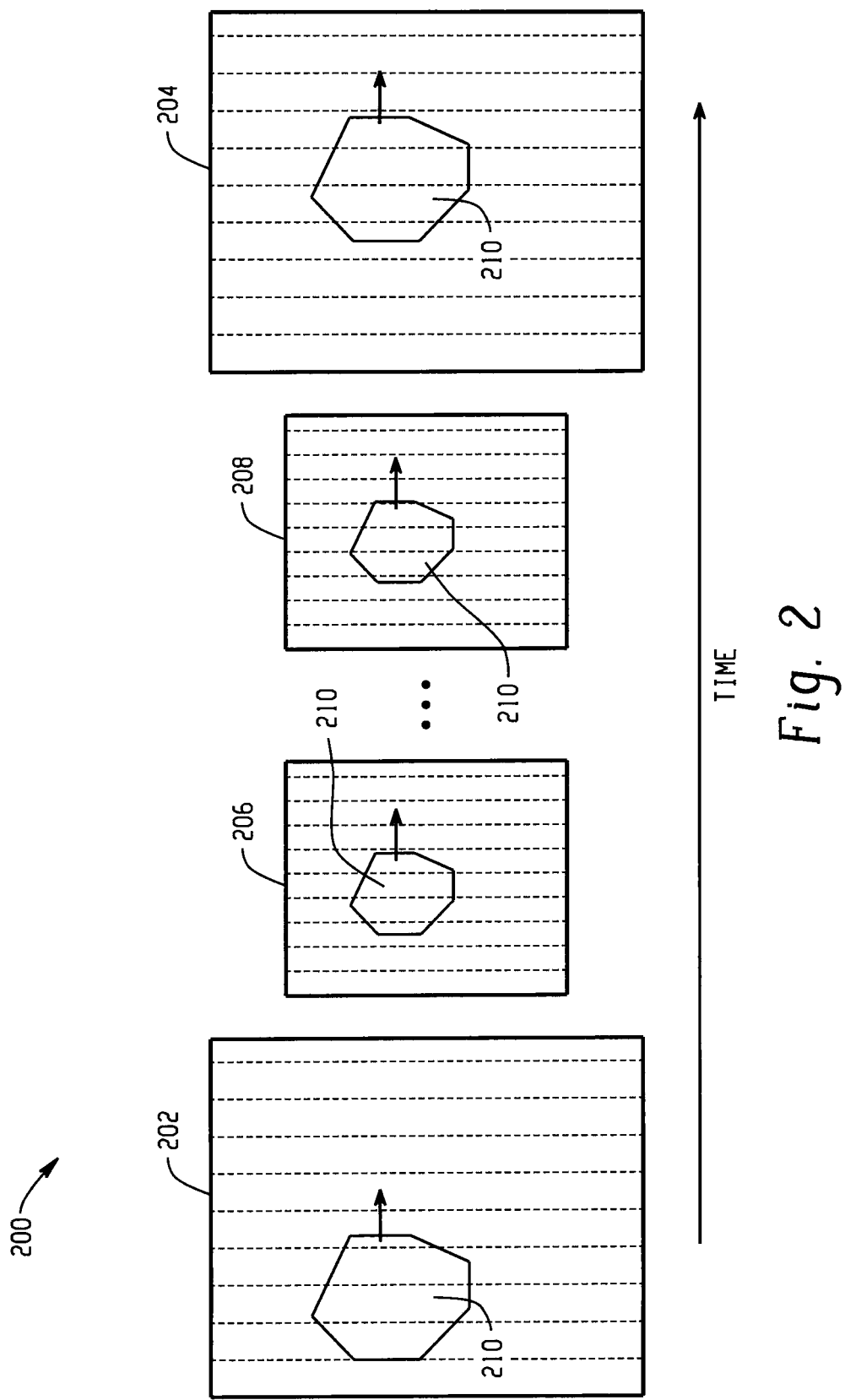
FIG. 2 depicts an upconversion of the video.

FIG. 2 depicts an upconversion of the video to a higher frame rate. The upconverted video retains the first frame 202 and the second frame 204. To accomplish the upconversion, a frame rate converter receives the first frame 202 and the second frame 204 from a source video and implants one or more interpolated frames 206, 208 into the video. Interpolating two additional frames 206, 208 between the first frame 202 and the second frame 204 changes the frame rate from the original rate to the higher rate.

Improper upconversion operations can be noticed by a viewer of the video and are undesirable. In the example of FIG. 2, the object 210 moves from left to right between the first frame 202 and the second frame 204. Thus, the interpolated frames 206, 208 should capture that motion of the object 210 by depicting increments of the motion within the interpolated frames (e.g., the first interpolated frame 206 should depict one-third ($\alpha=0.33$) of the object's motion from the first frame 202 to the second frame 204, and the second interpolated frame 208 should depict two-thirds ($\alpha=0.67$) of the object's motion from the first frame 202 to the second frame 204). Improper upconversion operations can result in choppy effects, halo effects, or other artifacts that can be detectable and displeasing to a user.

Figure 3:
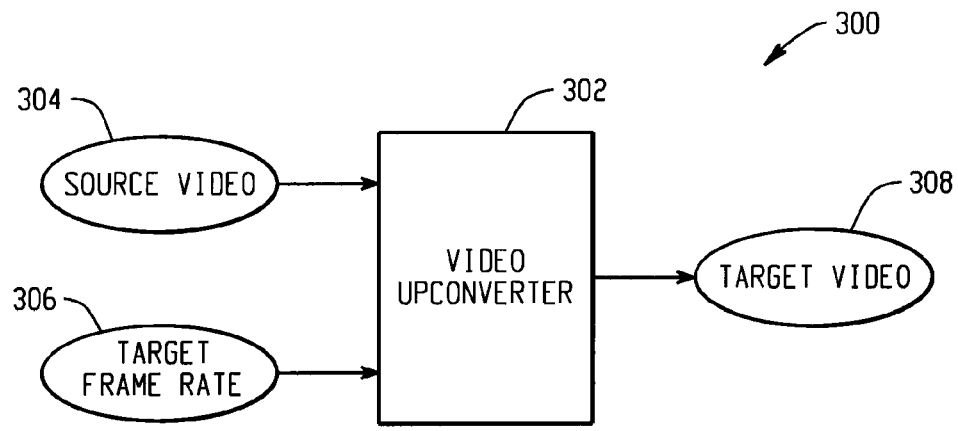
FIG. 3 is a block diagram depicting a video upconverter.

FIG. 3 is a block diagram depicting a video upconverter. The video upconverter 302 receives a source video 304 at a particular frame rate. The video upconverter 302 also receives a target frame rate 306 identifying the proper frame rate for the output target video 308. The video upconverter 302 processes the source video 304 to perform the video upconversion process, such as by integrating interpolated frames between the reference frames in the source video 304, to generate the target video 308 at the target frame rate 306.

Figure 4:
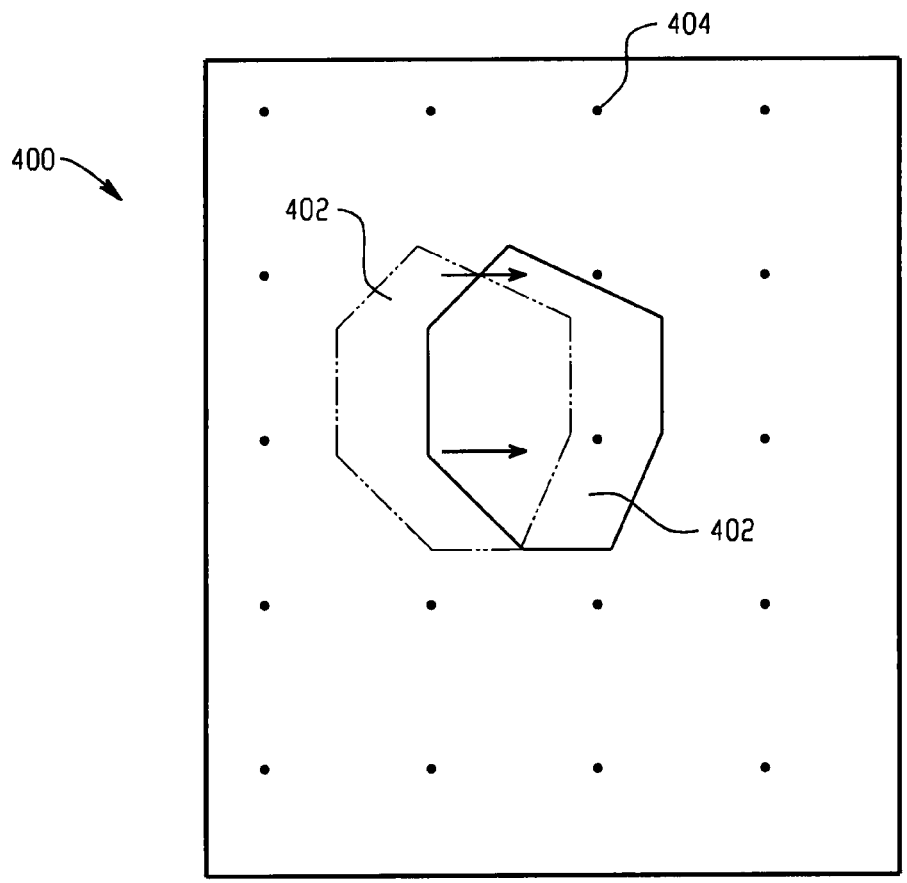
FIG. 4 depicts an example of a motion vector field identifying motion of blocks of pixels from a first frame to a second frame.

FIG. 4 is a diagram depicting one mechanism for performing video upconversion. Because video is a sequence of still frames, with motion simulated via fast presentation of those frames, there is no actual information about what is happening to objects in a scene during the time period between frames. Thus, interpolating frames in an upconversion process involves generating a prediction about what is happening to certain objects in the video and implementing that prediction in the new, interpolated frames. One mechanism of generating those predictions is a motion vector field. A motion vector field divides a frame into an array of blocks and identifies motion of those blocks from a first frame to a second frame. Thus, a motion vector field is an array of vectors identifying motion of corresponding pixel blocks from a first frame to a second frame.

FIG. 4 further depicts an example of a motion vector field identifying motion of blocks of pixels from a first frame to a second frame. (Only a small number of motion vectors are depicted for simplicity.) An object 402 is depicted at its position in a first frame (shown using dashed lines) and at its position in a second frame (shown using a solid line). The motion vector field (depicted using dots and arrows) is computed by identifying motion of blocks of pixels from the first frame to the second frame. This can be accomplished in a variety of ways. For example, a first block of pixels may be identified in the first frame, and a search may be performed for that block of pixels in the second frame. The difference in the positioning of the block of pixels from the first frame to the second frame identifies the motion of that block of pixels and is stored as a motion vector.

Oftentimes there is no motion of pixels from a first frame to a second frame. For example, pixels in the background of a scene may stay constant for several frames in a row. Those stationary blocks of pixels would have motion vectors of zero magnitude and direction, as indicated by the dots 404 in FIG. 4. Certain blocks of pixels do transition to a new position from the first frame to the second frame. For example, the blocks of pixels that make up the object 402 move from the first frame to the second frame. The motion vectors associated with these blocks of pixels in the motion vector field identify this motion and are depicted in FIG. 4 by arrows.

A video upconverter may utilize a motion vector field to generate interpolated frames. For example, if two interpolated frames are to be incorporated between each source video frame, then the interpolated frames may be generated based on the blocks of pixels and their associated motion vector. For example, a block of pixels that is has a motion vector identifying motion of nine pixels to the right from a first frame to a second frame, can be depicted in the first interpolated frame as having moved three pixels to the right and in the second frame as having moved 6 pixels (total) to the right.

Figure 5:
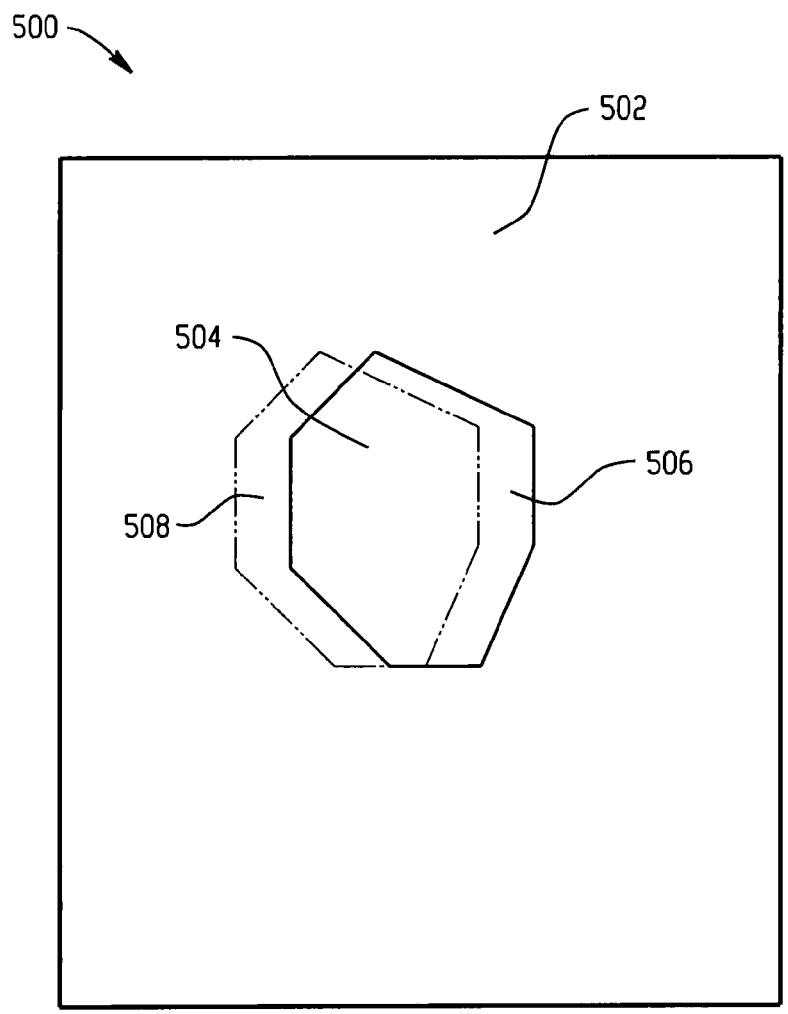
FIG. 5 is a diagram depicting the creation of occlusion regions and reveal regions by motion of objects between a first frame and a second frame.

FIG. 5 is a diagram depicting the creation of occlusion regions and reveal regions by the motion of objects between a first frame and a second frame. In FIG. 5, the object appearing in the first frame is noted using a dashed line, and that object as it appears in the second frame is shown using a solid line. Many regions of the frames stay constant from the first frame to the second frame. For example, background regions 502 may remain largely constant from the first frame to the second frame. These background regions 502 are handled when generating interpolated frames by repainting the stationary pixels. Certain regions 504 are also part of a foreground image in both the first frame and the second frame. These foreground regions 504 may be processed using motion vector fields as described with respect to FIG. 4.

Other regions are more challenging to address. For example, when an object moves from a position in a first frame to a position in a second frame, a certain occlusion region 506 is generated, where background pixels appear in the first frame but are covered by (i.e., occluded by) the object in the second frame. An occlusion region may be difficult to address using motion vectors because the movement of a block of pixels in the occlusion region from the first frame to the second frame cannot be determined based on the non-appearance of those blocks of pixels in the second frame.

A similar type of region 508 is formed that includes pixels that were part of a foreground object in the first frame but are uncovered by (i.e., revealed by) the foreground object in the second frame. Such a reveal region 508 may be difficult to address using motion vectors because the movement of a block of pixels in the reveal region from the first frame to the second frame cannot be determined based on the non-appearance of those blocks of pixels in the first frame.

Figure 6:
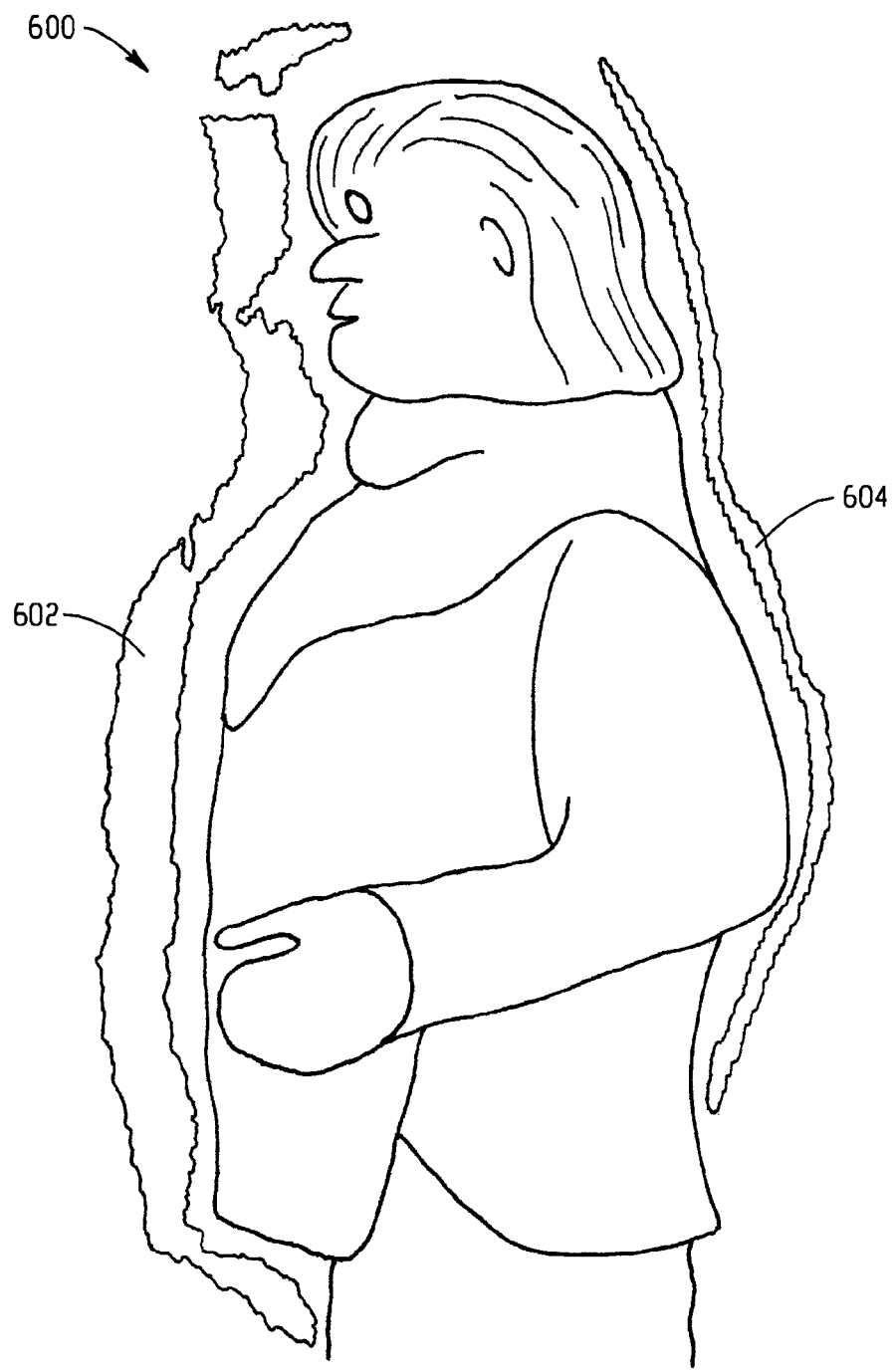
FIG. 6 depicts occlusion and reveal regions based on transition of a foreground object.

FIG. 6 depicts occlusion and reveal regions based on transition of a foreground object. As the woman moves from right to left from a first frame to a second frame, an occlusion region 602 is formed at her front, where background pixels appear in the first frame but have no matching pixels in the second frame. A reveal region 604 is formed at the woman's back, where background pixels appear in the second frame that have no match in the first frame. A video sequence can be modeled as a continuous series of intensity information f(x, t),t∈(Z), where $x=(x,y)^T$ are the spatial co-ordinates and t is the time. The frame rate up-conversion problem is to synthesize a frame f(x,α), t<α<t+1 at an arbitrary position α. To synthesize a motion compensated frame f(x,α), the corresponding motion vector field V(x,α) is estimated. A motion estimation algorithm may project motion vector field V(x,α) from the estimated vector field V(x,t+1) associated with motion between frames f(x,t) and f(x,t+1). Thus, the projected vector field V(x, α) may yield good results when the motion vector field is continuous between t and t+1. However, results may be unacceptable when the motion vector field is discontinuous due to motion vector errors or due to occlusions or reveals.

Figure 7:
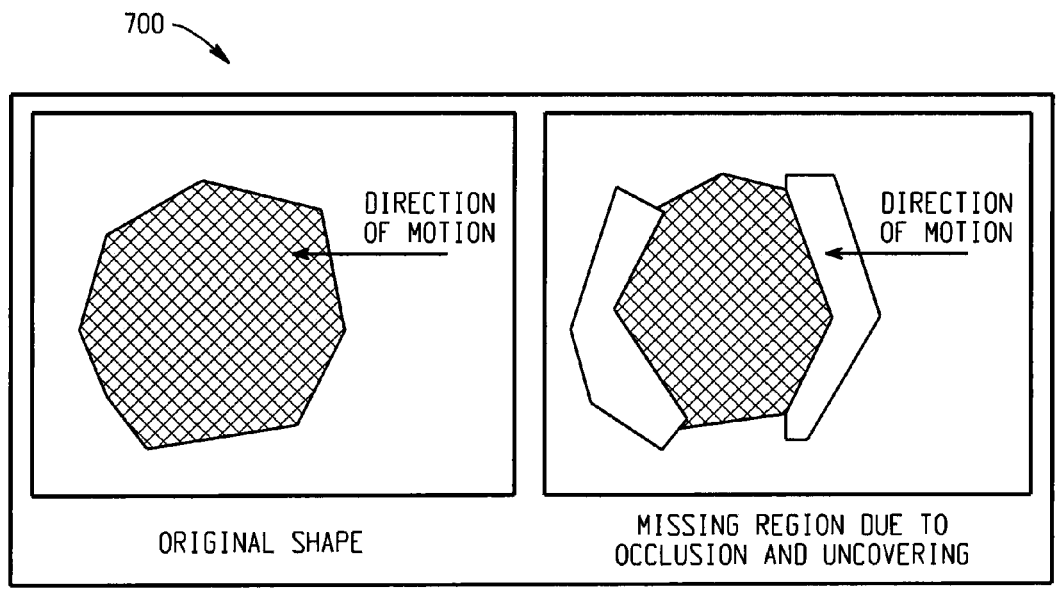
FIG. 7 is a diagram depicting regions where the motion vector field is discontinuous due to occlusion and reveal.

Such a phenomenon is illustrated in FIG. 7. FIG. 7 is a diagram depicting regions where the motion vector field is discontinuous due to occlusion and reveal. Operations may be performed to interpolate the vector field V(x,α) from the estimated vector field V(x,t) in the presence of discontinuity. Improper handling of occlusion and reveal operations can result in unwanted artifacts.

Figure 8:
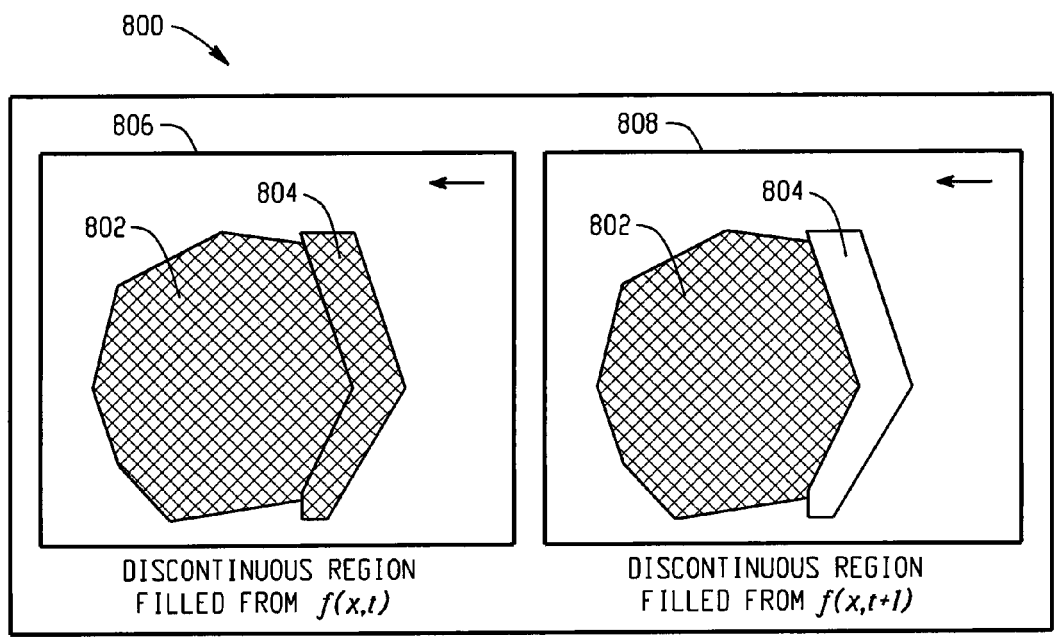
FIG. 8 is a diagram depicting a halo artifact created by incorrect use of motion vector field results.

FIG. 8 is a diagram depicting a halo artifact created by incorrect use of motion vector field results. During frame rate upconversion, a frame rate upconverter typically uses pixel data from a first frame and a motion vector field to generate interpolated frames between the first frame and a second frame. However, such an operation may yield improper results when a region of the frame is a reveal region. In FIG. 8, as the object 802 moves from right to left, a reveal region 804 is formed in the area which is uncovered by the object 802 in the transition from a first frame to a second frame. When the reveal region 804 is filled using data from first frame f(x,t), as shown in the left example 806, a halo artifact is generated in the reveal region 804. The halo artifact is created because the reveal region 804 should actually be filled by pixels from the background behind the object. That portion of the background is not present in the first frame because it is covered by the object 802. That portion of the background is present in the second frame after the object has moved from on top of that portion of the background. Instead of using pixel data from the first frame to fill the reveal region, pixel data from the second frame should be used to properly fill the reveal region, as shown in the example 808.

Figure 9:
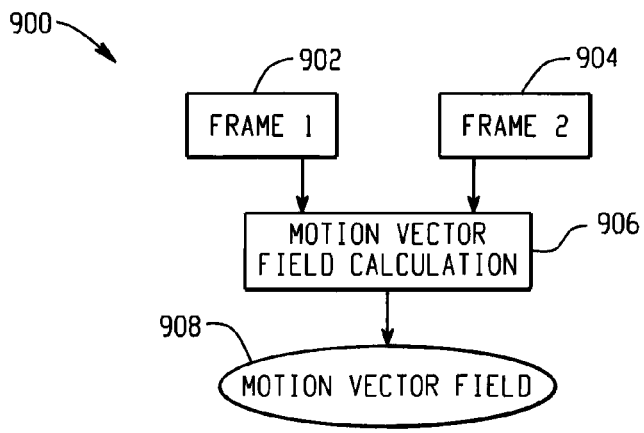
FIG. 9 is a block diagram depicting a determination of a motion vector field based on movement of pixels between a first frame and a second frame.

FIG. 9 is a block diagram depicting a determination of a motion vector field based on movement of pixels between a first frame and a second frame. A first frame 902 and a second frame 904 are received and a motion vector field calculation is made at 906 to generate a motion vector field 908. For example, a pixel or block of pixels may be identified in the first frame 902 and identified again in the second field 904. The difference in position of the pixel or block of pixels from the first frame 902 to the second frame 904 may be identified as a motion vector for that pixel or block of pixels in the motion vector field 908. Such a motion vector field 908 may be sufficient for properly generating many regions of an interpolated frame. However, additional processing may be used to better generate certain regions of an interpolated frame, such as occlusion regions and reveal regions.

Figure 10:
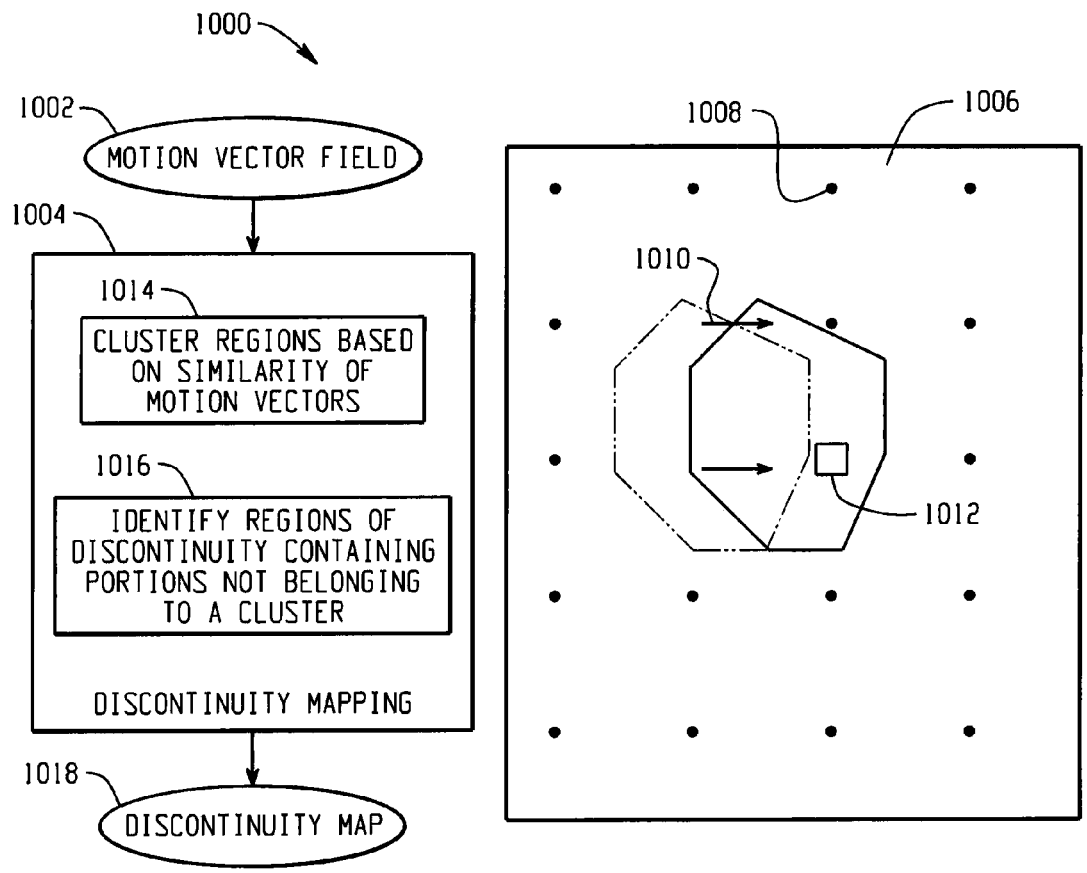
FIG. 10 is a block diagram depicting identification of regions of discontinuities based on a motion vector field.

FIG. 10 is a block diagram depicting identification of regions of discontinuities based on a motion vector field. A motion vector field 1002 is received for discontinuity mapping 1004. An example of a motion vector field is shown at 1006 based on motion of an object from left to right from a first frame (dotted outline of object) to a second frame (solid outline of object). Dots 1008 in the motion vector field 1006 represent blocks of pixels identified as not moving from the first frame to the second frame. An arrow 1010 in the motion vector field 1006 represents motion of a block of pixels from the first frame to the second frame. The square 1012 represents an anomalous motion vector in the motion vector field. The anomalous motion vector 1012 is significantly different than surrounding motion vectors in the example motion vector field 1006. In this example, the anomalous motion vector 1012 is generated because the anomalous motion vector is within an occlusion region. The position of the anomalous motion vector 1012 is part of the background in the first frame and is part of the foreground object in the second frame. Thus, when the block of pixels present in the background in the first frame is searched for in the second frame, that block of pixels cannot be found because it is covered by the object in the second frame.

To identify regions of discontinuity, regions of the motion vector field 1002 are clustered at 1014 based on similarity of motion vectors. Regions associated with a particular object (e.g., the background, the object) in both the first frame and the second frame will likely contain similar motion vectors (e.g., very small motion vectors for the background regions, motion vectors consistent with left to right motion for the object regions). Following clustering, certain regions will not be associated with any clusters because the motion vectors in those certain regions are not consistent (e.g., the region containing the anomalous vector 1012) because of difficulty mapping blocks of pixels in those regions from the first frame to the second frame due to occlusions or reveals. Regions of discontinuity containing portions of the motion vector field 1002 not belonging to a cluster may be identified at 1016 and be identified in a discontinuity map 1018.

As noted in the discussion of FIG. 8, to avoid unwanted artifacts, it may be beneficial to identify whether a region of discontinuity is an occlusion region or a reveal region. If the region of discontinuity is an occlusion region, then pixel data from the first frame can be used in filling the region of discontinuity in interpolated frames. If the region of discontinuity is a reveal region, then pixel data from the second frame can be used in filling the region of discontinuity in interpolated frames.

Regions of discontinuity can be classified as occlusion regions or reveal regions using inflow and outflow vector fields. Inflow and outflow vector fields may be identified using a determined motion vector field based on movement of pixels between a first frame and a second frame. The motion vector field V(x,t) maps regions in the frame f(x,t) to regions in the next frame f(x,t+1). The motion vector field V(x,t) may be regularized before inflow and outflow vector fields are determined. Regularization may include smoothing of vector fields and motion vector clustering. Motion vector clustering may help detect dominant object motion and in smoothing the motion vector field spatially and temporarily.

An inflow motion vector field may be calculated based on forward motion estimation of pixel motion from f(x,t) to f(x,t+1) (e.g., using the regularized motion vector field) using a block correlation technique. During this process, a kernel centered at a pixel from f(x,t) is matched with a set of regions from f(x,t+1) guided by the motion vector field V(x,t). The refined inflow motion vector $V_i(x,t)$ is then assigned to the pixel corresponding to the highest correlation value. After the completion of the process, all pixels in f(x,t) are matched with pixels from f(x,t+1) and are assigned an inflow motion vector $V_i(x,t)$. The inflow motion vector field $V_i(x,t)$ may be further filtered to enforce smoothness constraints. When mapping all pixels in f(x,t) to pixels in f(x,t+1), the set of pixels that are left un-mapped in f(x,t+1) are the pixels that are visible only in f(x,t+1). This region is identified as a reveal region.

A similar method may be used to compute the outflow vector field. Pixels in f(x,t+1) are matched with pixels in f(x,t) to form an outflow motion vector field $V_o(x,t)$. Smoothness constraints may be imposed on the outflow motion vector field. The set of pixels that remain unmapped in f(x,t) after the mapping process are pixels in f(x,t) that are not visible in f(x,t+1). This region is identified as the occlusion region.

Figure 11:
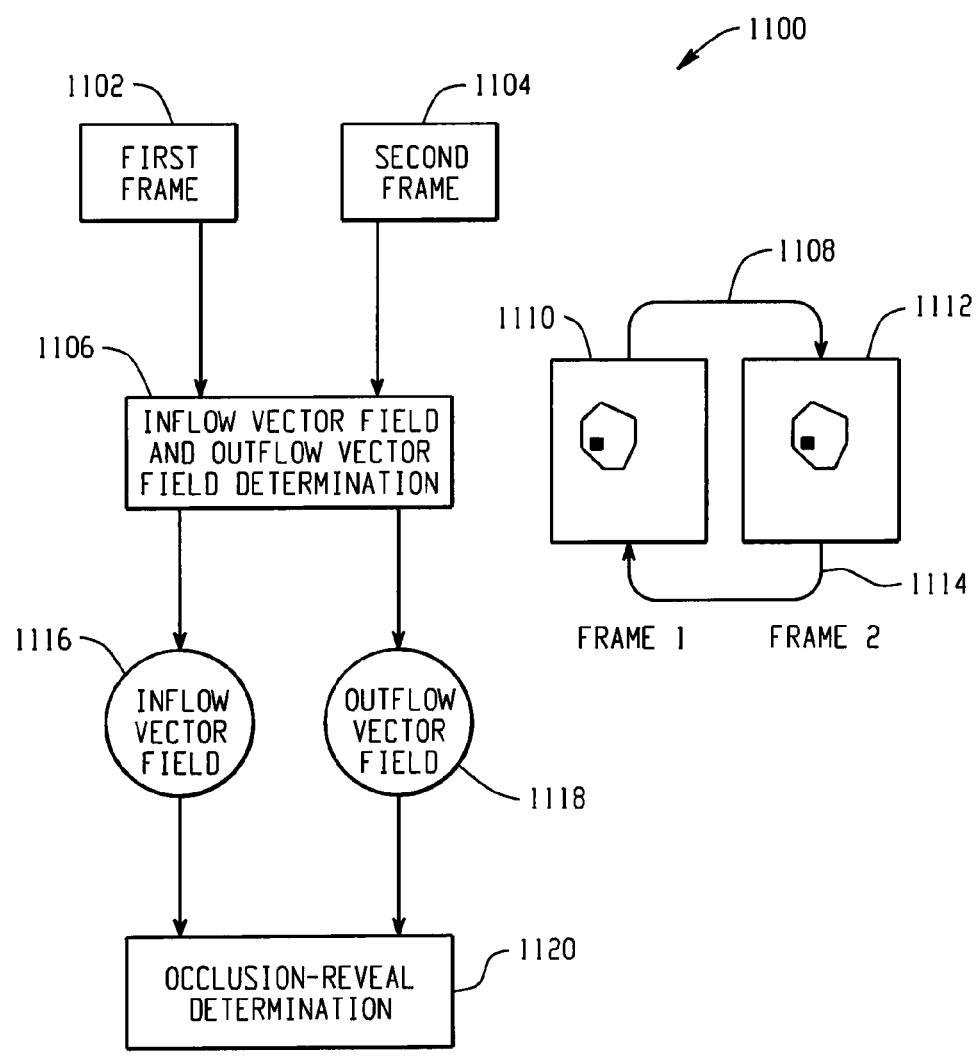
FIG. 11 is a block diagram depicting an occlusion region or reveal region determination.

FIG. 11 is a block diagram depicting an occlusion region or reveal region determination. A first frame 1102 and a second frame 1104 are received. Inflow vector fields and outflow vector fields are calculated at 1106 based on the received first frame 1102 and the received second frame 1104. For example, an inflow vector field is calculated, as shown at 1108, based on mapping pixel movement from frame 1 (1110) to frame 2 (1112). An outflow vector field is calculated, as shown at 1114, based on mapping pixel movement from frame 2 (1112) to frame 1 (1110). The inflow vector field 1116 and the outflow vector field 1118 are used to determine whether a region of discontinuity is an occlusion region or a reveal region at 1120.

In-painting is an image restoration technique that may be used to fill regions of discontinuity to avoid unwanted artifacts. Given an image or video I=Φ∪Ω, where Φ is the source region containing a set of pixels whose value is known and Ω is the target region (hole) containing a set of pixels whose value is to be determined, δΩ represents the boundary between source and target region, which is a contour in two dimensions and a surface in three dimensions. For all boundary pixels p∈δΩ, $\upsilon_p$ denotes a patch centered at p.

For two-dimensional in-painting, a starting point may be based on a priority term. Random access of patch data may be suboptimal because of restrictions on data fetch and line buffer size. One method of patch filling starts from a first hole encountered in raster scan order and progresses in the direction given by: $D(p)=|\nabla I_p^\perp \cdot n_p|$, where $\nabla I_p$ is the spatio-temporal gradient of image intensity and $n_p$ is a normal vector to the boundary surface. Thus, a patch centered at pixel (x,t) is selected as the starting point for filling. A search is performed over all patches $\upsilon_p \in \Phi$ for best matching patch $\upsilon_{\hat{q}}$ according to a modified sum of squared difference criterion $d(\upsilon_p, \upsilon_q)$, which includes only those pixels of $\upsilon_p$ which are already filled. Values for all pixels r∈$\upsilon_p$∩Ω are copied from corresponding pixels in $\upsilon_{\hat{q}}$.

Two dimensional in-painting may be extended to three dimensions for video upconverting. One approach to three dimensional in-painting is to extend the above described two-dimensional approach by treating the video as a collection of frames or images and performing the same operation on each frame independently. Two disadvantages may arise with such an approach. Because of temporal correlation among the frames, a matching patch is likely to be found in temporally adjacent frames, especially if a portion of the region to be filled (and hence absent) in one frame is present in some other neighboring frame. Another disadvantage is that even if every filled frame is spatially coherent, temporal coherence is not ensured, which may result in visible artifacts in the video.

Thus, it may be beneficial to use three-dimensional spatio-temporal patches in the present framework. Such an approach may better ensure temporal consistency in video frames. To begin such an approach, a generalization of $D(p)=|\nabla I_p^\perp \cdot n_p|$ is derived. Such a generalization is not obvious. Although computation of the spatio-temporal gradient of image intensity, $\nabla I_p$, and normal vector, $n_p$, to the boundary surface is possible, there is no unique perpendicular direction to the gradient of image intensity, $\nabla I_p^\perp$. Thus a modified data term using cross products of vectors is utilized: $D(p)=|I_p \times n_p|$, which is defined for both two-dimensions and three-dimensions, and maintains the intuition of propagating structural information and reduces to $D(p)=|\nabla I_p^\perp \cdot n_p|$ in two dimensions. To calculate the normal vector, $n_p$, to the boundary surface δΩ, a binary mask for Ω is maintained whose smoothed gradient results in a normal vector, $n_p$, to the boundary surface δΩ.

Figure 12:
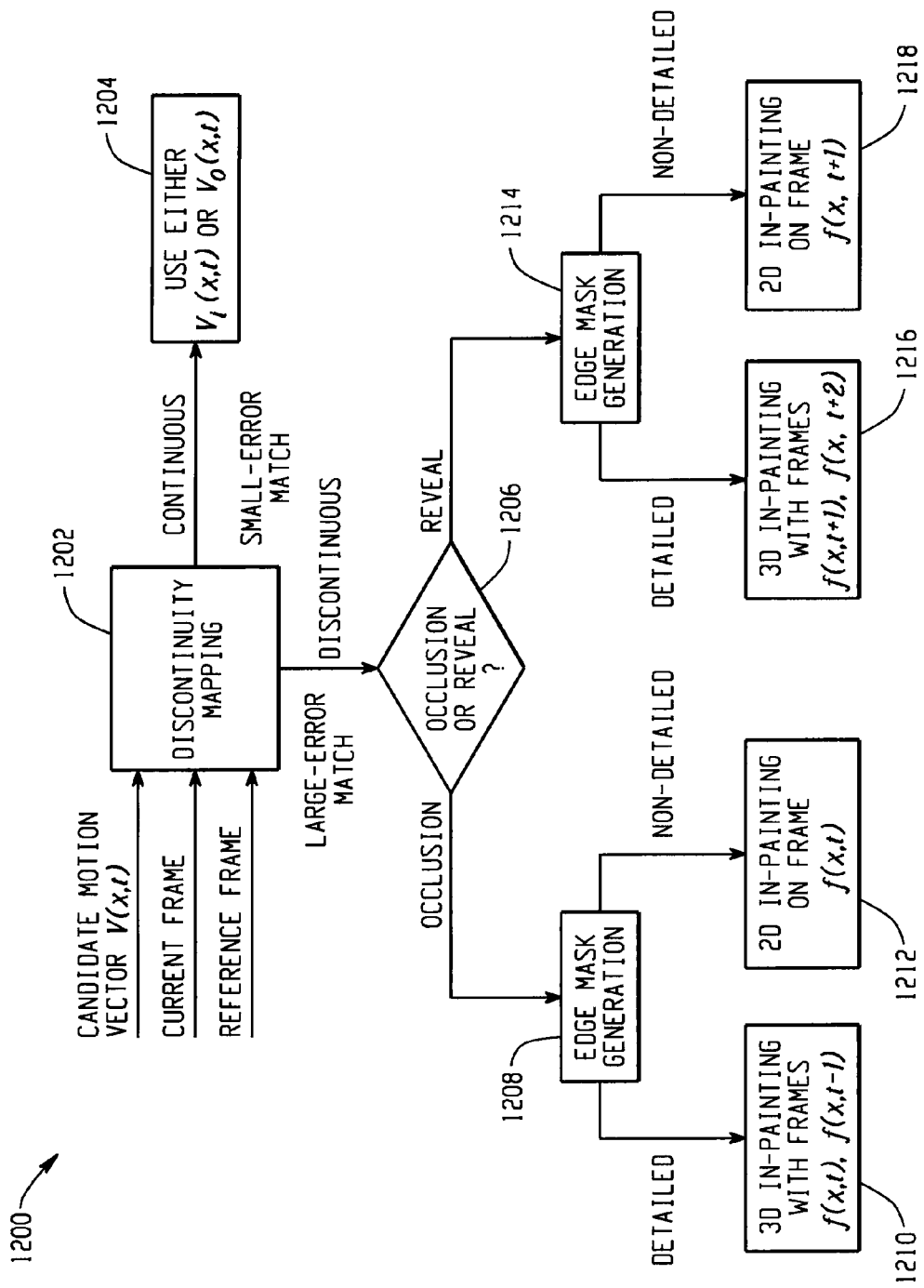
FIG. 12 is a block diagram depicting an example of a frame rate upconversion process.

FIG. 12 is a block diagram depicting an example of a frame rate upconversion process. At 1202, a first reference frame, a second current frame, and a candidate motion vector (e.g., a motion vector from a motion vector field) are received for discontinuity mapping. If a portion of the frame is found to have continuous motion vectors, with small errors among surrounding vectors, then at 1204 that portion of the frame is considered continuous, and the pixels in that portion are filled using basic motion vector techniques in the interpolated frames. If a portion of the frame is found to have motion vectors that are considered anomalous, with larger errors among surrounding vectors, then that portion of the frame is identified as a region of discontinuity. At 1206, a determination is made as to whether the region of discontinuity is an occlusion region or a reveal region.

When the region of discontinuity is determined to be an occlusion region, then at 1208 an edge mask generation procedure may be performed to estimate positions of edges in the interpolated frames. At 1210, 1212, interior portions of the occlusion region are then filled using an in-painting process. If a portion to be in-painted is a detailed region (e.g., contains several different pixel values or patterns), then at 1210 a three-dimensional in-painting process may be utilized that uses patches from the reference frame (and in certain embodiments a frame prior to the reference frame) to fill the detailed area. If a portion to be in-painted is a non-detailed region (e.g., contains solid or few colors), then at 1212 a two-dimensional in-painting process may be utilized that uses patches from the reference frame to fill the detailed area.

When the region of discontinuity is determined to be a reveal region, then at 1214 an edge mask generation procedure may be performed to estimate positions of edges in the interpolated frames. Interior portions of the reveal region are then filled using an in-painting process at 1216, 1218. If a portion to be in-painted is a detailed region (e.g., contains several different pixel values or patterns), then at 1216 a three-dimensional in-painting process may be utilized that uses patches from the current frame (and in certain embodiments a frame subsequent to the current frame) to fill the detailed area. If a portion to be in-painted is a non-detailed region (e.g., contains solid or few colors), then at 1218 a two-dimensional in-painting process may be utilized that uses patches from the current frame to fill the detailed area.

A searching operation for a best matching patch may be a computationally demanding part of the present algorithm. An efficient approach is useful if performing frame rate upconversion in real-time. In one implementation, a best match $\Psi_{\hat{p}}$ for the selected patch is sought in the search range $\Phi$. Translations of the patch are sought such that the portion of the patch overlapping the surrounding regions matches it well (e.g., only translations that allow complete overlap of the patch with the surrounding region are considered. The cost of a translation of the patch can be defined as:

$$C(t) = \sum_{p \in \Psi \hat{p} \cap (I-\Omega)} |l(p-t) - l(p)|^2,$$

where l(p) denotes intensity or color value at pixel p. When the domain of summation is a simple rectangular region, the search can be accelerated using a Fast Fourier Transform such that $$C(t) = \sum_{p \in \Psi \hat{p} \cap (I-\Omega)} (p-t)^2 - 2l(p-t)l(p) + l(p)^2.$$

The third term is independent of t and can be discarded from consideration when minimizing over t. The first term is a sum of squares of pixel values over the search region around the patch. For a non-masked region, the first term can be located efficiently in O(n) time. The second term is a convolution of the patch with the image search region and for a non-masked region can be computed in O(n log(n)) time using a Fast Fourier Transform. For non-rectangular summation regions, this algorithm can be modified. For the second term, the presence of the filled and unfilled pixels in the patch may hinder straightforward implementation of the convolution. This problem can be circumvented by assuming the masked region of the patch does not contribute to the convolution sum. The unfilled pixels can be set to zero values and the convolution can be evaluated as a product of the Fourier transforms of the two terms. The first term consists of summation of square of intensities of pixels of the image which correspond to filled pixels of the patch. For different values of translation t, this summation can be expressed as a convolution of the "squared" image with an appropriate binary mask, which can be calculated efficiently using a Fast Fourier Transform.

Figure 13A:
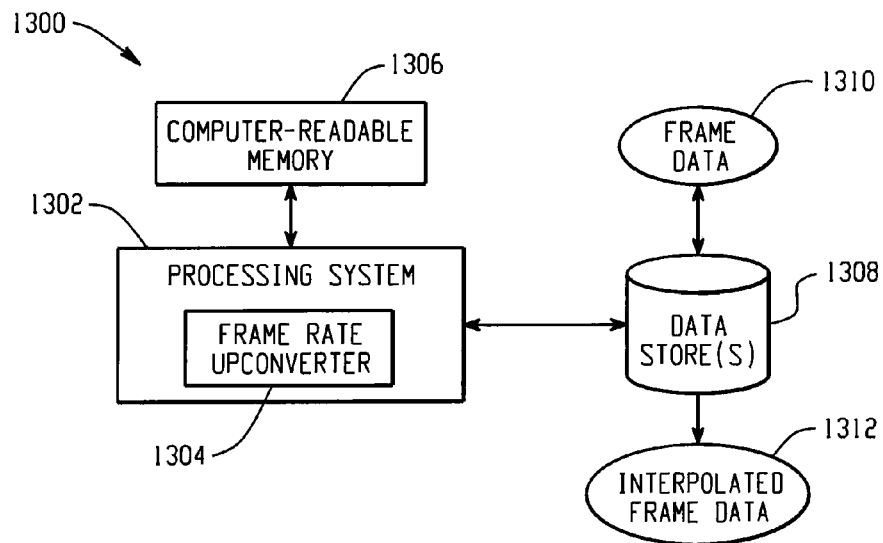
FIGS. 13A, 13B, and 13C depict examples of systems for use in implementing a frame rate upconverter.
Figure 13B:
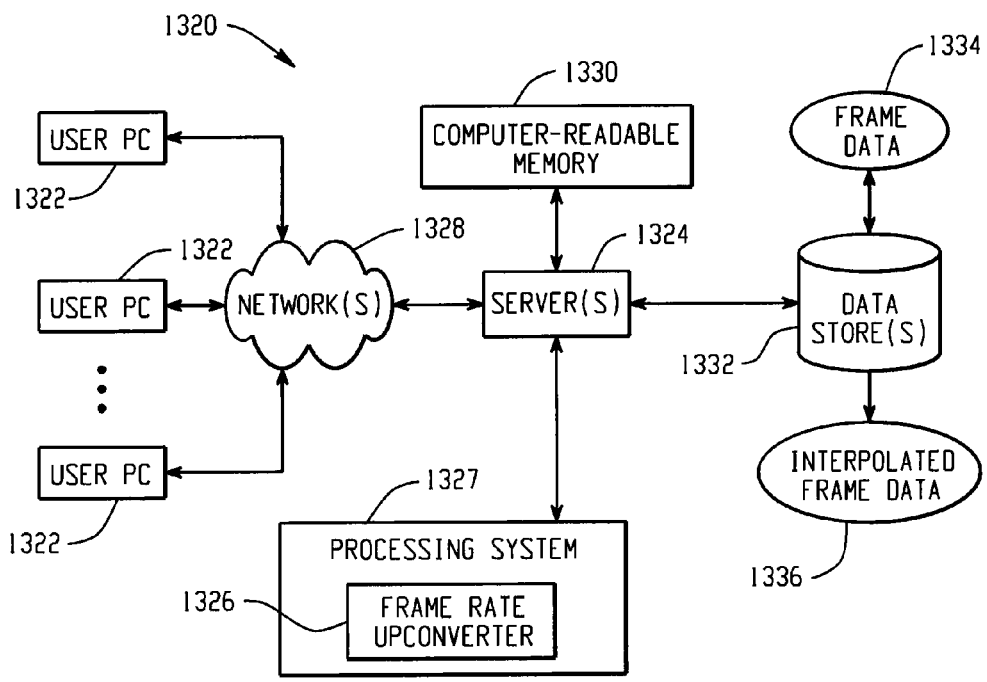
Figure 13C:
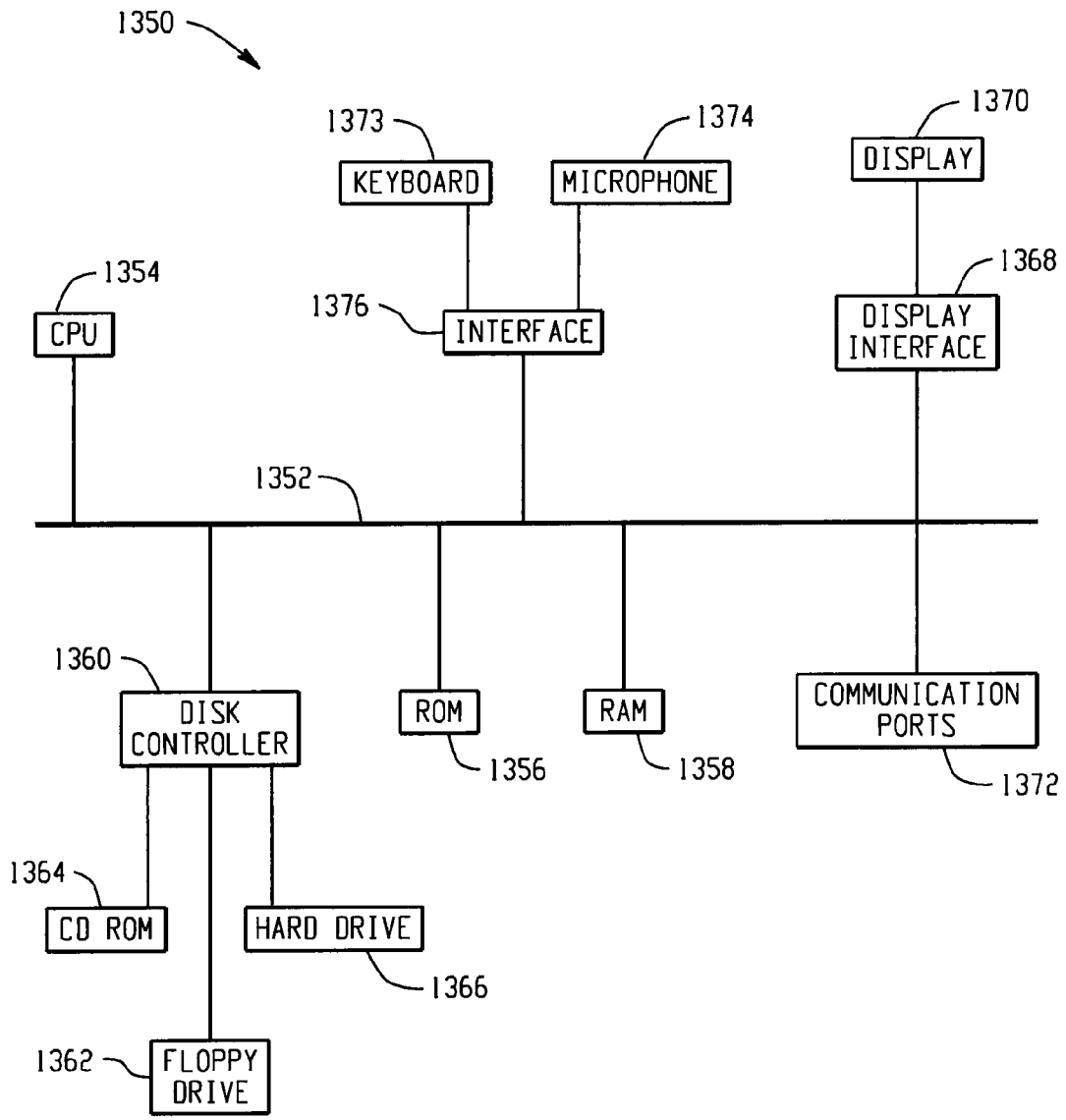

FIGS. 13A, 13B, and 13C depict examples of systems for use in implementing a frame rate upconverter. For example, FIG. 13A depicts an example of a system 1300 that includes a stand alone computer architecture where a processing system 1302 (e.g., one or more computer processors) includes a frame rate upconverter 1304 being executed on it. The processing system 1302 has access to a computer-readable memory 1306 in addition to one or more data stores 1308. The one or more data stores 1308 may include frame data 1310 as well as interpolated frame data 1312.

FIG. 13B depicts a system 1320 that includes a client server architecture. One or more user PCs 1322 access one or more servers 1324 running a frame rate upconverter 1326 on a processing system 1327 via one or more networks 1328. The one or more servers 1324 may access a computer readable memory 1330 as well as one or more data stores 1332. The one or more data stores 1332 may contain frame data 1334 as well as interpolated frame data 1336.

FIG. 13C shows a block diagram of an example of hardware for a standalone computer architecture 1350, such as the architecture depicted in FIG. 13A that may be used to contain and/or implement the program instructions of system embodiments of the present invention. A bus 1352 may connect the other illustrated components of the hardware. A processing system 1354 labeled CPU (central processing unit) (e.g., one or more computer processors), may perform calculations and logic operations required to execute a program. A processor-readable storage medium, such as read only memory (ROM) 1356 and random access memory (RAM) 1358, may be in communication with the processing system 1354 and may contain one or more programming instructions for performing the method of implementing a frame rate upconverter. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 1360 interfaces one or more optional disk drives to the system bus 1352. These disk drives may be external or internal floppy disk drives such as 1362, external or internal CD-ROM, CD-R, CD-RW or DVD drives such as 1364, or external or internal hard drives 1366. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1360, the ROM 1356 and/or the RAM 1358. Preferably, the processor 1354 may access each component as required.

A display interface 1368 may permit information from the bus 1356 to be displayed on a display 1370 in audio, graphic, or alphanumeric format. Communication with external devices may optionally occur using various communication ports 1372.

In addition to the standard computer-type components, the hardware may also include data input devices, such as a keyboard 1373, or other input device 1374, such as a microphone, remote control, pointer, mouse and/or joystick.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores and non-transitory computer-readable mediums, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

A processor, as used herein, may include any hardware device for processing data, such as a data processor, central processing unit, an integrated circuit or other chip, an application-specific integrated circuit, a field programmable gate array, hard-wired circuit components, or other devices for processing data.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A processor implementable method comprising:
   receiving from a video source, (i) a first video frame consisting of first blocks of pixels, and (ii) a second video frame consisting of second block pixels, wherein the second video frame is after the first video frame in time; and
   generating an interpolated video frame based on pixels in the first video frame and the pixels in the second video frame, wherein generating the interpolated video frame comprises
      generating a motion vector field based on movement of pixels between the first video frame and the second video frame, the motion vector field including a plurality of motion vectors that identify motion of corresponding blocks of pixels from the first video frame to the second video frame,
      identifying a region of discontinuity in the motion vector field, wherein motion vectors for pixels in the region of discontinuity differ significantly from motion vectors for surrounding pixels,
      determining whether the region of discontinuity is due to (i) the first video frame containing background objects which are not visible in the second video frame or (ii) the second video frame containing background objects which are not visible in the first video frame,
      in response to the region of discontinuity being due to the first video frame containing background objects which are not visible in the second video frame, selecting a pixel patch from the first video frame,
      in response to the region of discontinuity being due to the second video frame containing background objects which are not visible in the first video frame, selecting the pixel patch from the second video frame,
      selecting a location in the interpolated frame for positioning the selected pixel patch such that a portion of the pixel patch that overlaps the surrounding pixels matches the surrounding pixels, and
      filling the region of discontinuity in the interpolated frame with pixels of the selected pixel patch, with the patch positioned in the selected location,
   wherein the selected pixel patch is of sufficient size to both completely cover the region of discontinuity and overlap the surrounding pixels,
   wherein the location for positioning the selected pixel patch is selected so that a portion of the selected pixel patch that overlaps with the surrounding pixels covers the surrounding pixels.

2. The method of claim 1, wherein the determining whether the region of discontinuity is due to (i) the first video frame containing background objects or (ii) the second video frame containing background objects includes determining an inflow vector field and an outflow vector field, wherein the inflow vector field is determined based on movement of pixels from the first frame to the second frame, and wherein the outflow vector field is determined based on movement of pixels from the second frame to the first frame.

3. The method of claim 2, wherein the motion vector field is smoothed prior to being used in generating the inflow vector field and the outflow vector field.

4. The method of claim 1, wherein the region of discontinuity is filled using an in-painting operation.

5. The method of claim 1, wherein the interpolated frame is generated during a frame rate up-conversion.

6. The method of claim 1, wherein the first frame precedes a frame that precedes the interpolated frame.

7. The method of claim 1, wherein the second frame follows a frame that follows the interpolated frame.

8. A system, comprising:
   one or more data processors;
   a non-transitory computer-readable medium encoded with instructions for commanding the one or more data processors to:
   receive from a video source, (i) a first video frame consisting of first blocks of pixels, and (ii) a second video frame consisting of second block pixels, wherein the second video frame is successive to the first video frame in time; and
   generate an interpolated video frame based on pixels in the first video frame and the pixels in the second video frame, wherein generating the interpolated video frame comprises
      generating a motion vector field based on movement of pixels between the first video frame and the second video frame, the motion vector field including a plurality of motion vectors that identify motion of corresponding blocks of pixels from the first video frame to the second video frame, identifying a region of discontinuity in the motion vector field, wherein motion vectors for pixels in the region of discontinuity differ significantly from motion vectors for surrounding pixels, determining whether the region of discontinuity is due to (i) the first video frame containing background objects which are not visible in the second video frame or (ii) the second video frame containing background objects which are not visible in the first video frame, in response to the region of discontinuity being due to the first video frame containing background objects which are not visible in the second video frame, selecting a pixel patch from the first video frame, in response to the region of discontinuity being due to the second video frame containing background objects which are not visible in the first video frame, selecting the pixel patch from the second video frame, selecting a location in the interpolated frame for positioning the selected pixel patch such that a portion of the patch that overlaps the surrounding pixels matches the surrounding pixels, and filling the region of discontinuity in the interpolated frame with pixels of the selected pixel patch, with the patch positioned in the selected location, wherein the selected pixel patch is of sufficient size to both completely cover the region of discontinuity and overlap with surrounding pixels, wherein the location for positioning the selected pixel patch is selected so that a portion of the selected pixel patch that overlaps with the surrounding pixels covers the surrounding pixels.

9. The system of claim 8, wherein the determining whether the region of discontinuity is due to (i) the first video frame containing background objects or (ii) the second video frame containing background objects includes determining an inflow vector field and an outflow vector field, wherein the inflow vector field is determined based on movement of pixels from the first frame to the second frame, and wherein the outflow vector field is determined based on movement of pixels from the second frame to the first frame.

10. The system of claim 9, wherein the motion vector field is smoothed prior to being used in generating the inflow vector field and the outflow vector field.

11. The system of claim 8, wherein the region of discontinuity is filled using an in-painting operation.

12. The system of claim 8, wherein the interpolated frame is generated during a frame rate up-conversion.

13. The system of claim 8, wherein the first frame precedes a frame that precedes the interpolated frame.

14. The system of claim 8, wherein the second frame follows a frame that follows the interpolated frame.

15. A non-transitory computer-readable medium encoded with instructions for commanding one or more data processors to execute a method of determining pixels in an interpolated frame, the method comprising:

receiving from a video source, (i) a first video frame consisting of first blocks of pixels, and (ii) a second video frame consisting of second block pixels, wherein the second video frame is successive to the first video frame in time; and generating an interpolated video frame based on pixels in the first video frame and the pixels in the second video frame, wherein generating the interpolated video frame comprises generating a motion vector field based on movement of pixels between the first video frame and the second video frame, the motion vector field including a plurality of motion vectors that identify motion of corresponding blocks of pixels from the first video frame to the second video frame, identifying a region of discontinuity in the motion vector field, wherein motion vectors for pixels in the region of discontinuity differ significantly from motion vectors for surrounding pixels, determining whether the region of discontinuity is due to (i) the first video frame containing background objects which are not visible in the second video frame or (ii) the second video frame containing background objects which are not visible in the first video frame, in response to the region of discontinuity being due to the first video frame containing background objects which are not visible in the second video frame, selecting a pixel patch from the first video frame, in response to the region of discontinuity being due to the second video frame containing background objects which are not visible in the first video frame, selecting the pixel patch from the second video frame, selecting a location in the interpolated frame for positioning the selected pixel patch such that a portion of the patch that overlaps the surrounding pixels matches the surrounding pixels, and filling the region of discontinuity in the interpolated frame with pixels of the selected pixel patch, with the patch positioned in the selected location, wherein the selected pixel patch is of sufficient size to both completely cover the region of discontinuity and overlap with surrounding pixels, wherein the location for positioning the selected pixel patch is selected so that a portion of the selected pixel patch that overlaps with the surrounding pixels covers the surrounding pixels.

16. The computer-readable medium of claim 15, wherein the first frame precedes a frame that precedes the interpolated frame.

17. The computer-readable medium of claim 15, wherein the second frame follows a frame that follows the interpolated frame.

* * * * *